July 4, 1967  A. D. KURTZ ETAL  3,329,023

SEMICONDUCTOR STRAIN GAGE TRANSDUCERS

Filed Aug. 3, 1964

INVENTORS
ANTHONY D. KURTZ
BY EDGAR J. JONES

ATTORNEYS

July 4, 1967     A. D. KURTZ ETAL     3,329,023

SEMICONDUCTOR STRAIN GAGE TRANSDUCERS

Filed Aug. 3, 1964     3 Sheets-Sheet 2

INVENTORS
ANTHONY D. KURTZ
BY EDGAR J. JONES

ATTORNEYS

INVENTORS
ANTHONY D. KURTZ
BY EDGAR J. JONES

*Blair & Buckles*

ATTORNEYS

United States Patent Office 3,329,023
Patented July 4, 1967

3,329,023
SEMICONDUCTOR STRAIN GAGE TRANSDUCERS
Anthony D. Kurtz, Englewood, N.J., and Edgar J. Jones, Weston, Mass., assignors to Schaevitz-Bytrex, Inc., a corporation of New Jersey
Filed Aug. 3, 1964, Ser. No. 387,043
4 Claims. (Cl. 73—398)

This invention relates to a novel strain-sensitive element of semiconductor material and to strain gage units and load cells incorporating the element. More specifically, it relates to a strain-sensitive element comprising a thin surface layer of semi-conductor material integral with an interior region having a conductivity of the type opposite that of the layer. The two regions are thus separated by a p-n junction.

Until fairly recently strain gages almost invariably incorporated lengths of metallic wire or foil arranged in various configurations, together with adhesives suitable for affixing them to objects whose strain was to be measured. The resistance of a metallic conductor increases as it is stretched in a lengthwise direction and decreases when it is compressed. Thus, the resistance of a strain gage changes according to the strain on the surface to which it is affixed. The resistance variations are generally ascertained by measuring the unbalance in a bridge circuit in which the gage is connected.

A newer version of the strain gage uses semiconductor material as the strain-sensitive resistance element. These gages provide an improvement in sensitivity by better than an order of magnitude and this, combined with their relatively small size makes their use highly advantageous in many applications.

A problem involving strain gages concerns their use in load cells. The latter are devices used to measure forces, torques and pressures in various ways. When incorporating a strain gage, a load cell generally comprises a body on which the force, etc., is imposed, and a strain gage attached to the body measures the strain therein resulting from the force. The resistance of the strain gage is thus a function of the parameter to be measured and a meter indicating the unbalance in the strain gage bridge can be calibrated in terms of this parameter. The accuracy of measurement with such load cells has, in the past, been limited by the fact that not all of the strain in the load bearing body is transmitted to the gage. Some of it is taken up by the intervening layer of adhesive. The properties of the adhesive vary with such factors as temperature, humidity and age, thereby affecting the relationship between the parameter to be measured and the electrical output of the strain gage.

Accordingly, it is the principal object of our invention to provide an improved load cell construction adapted for measurement of forces and pressures, as well as other similar physical phenomena. A more specific object of the invention is to provide an improved load cell of the type using a strain-sensitive resistance unit to provide an electrical output indicative of the load to be measured.

Another object of the invention is to provide an improved strain-sensitive resistance unit adapted for use in a load cell of the above type.

A further object of the invention is to provide a strain-sensitive resistance unit of the above type using semiconductor resistance elements.

Other objects of the invention will in part be obvious and will in part appear hereinafter.

The invention accordingly comprise the apparatus embodying features of construction, combinations of elements and arrangements of parts which are exemplified in the following detailed disclosure, and the scope of the invention will be indicated in the claims.

For a fuller understanding of the nature and objects of the invention, reference should be had to the following detailed description taken in connection with the accompanying drawings, in which.

Figure 1:
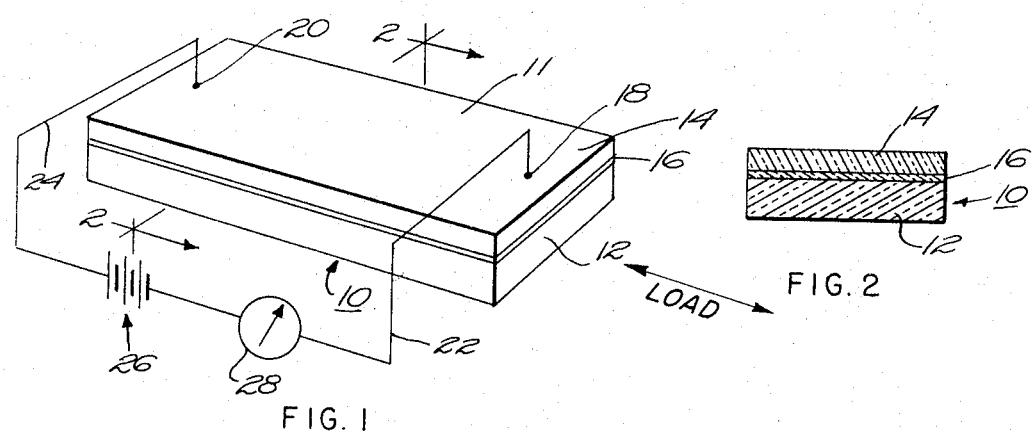
FIG. 1 is a partly schematic illustration, in perspective, of a semiconductor strain-sensitive element.
Figure 3:
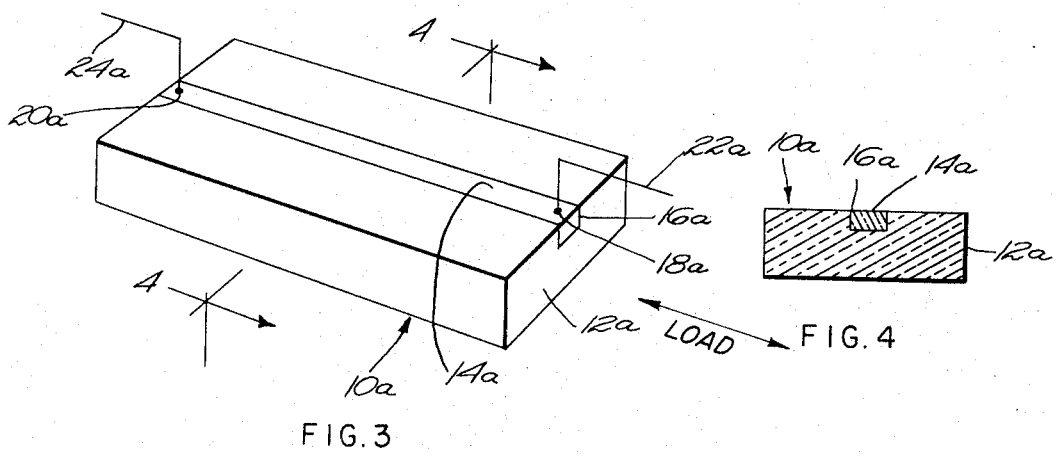
Figure 4:
Figure 5:
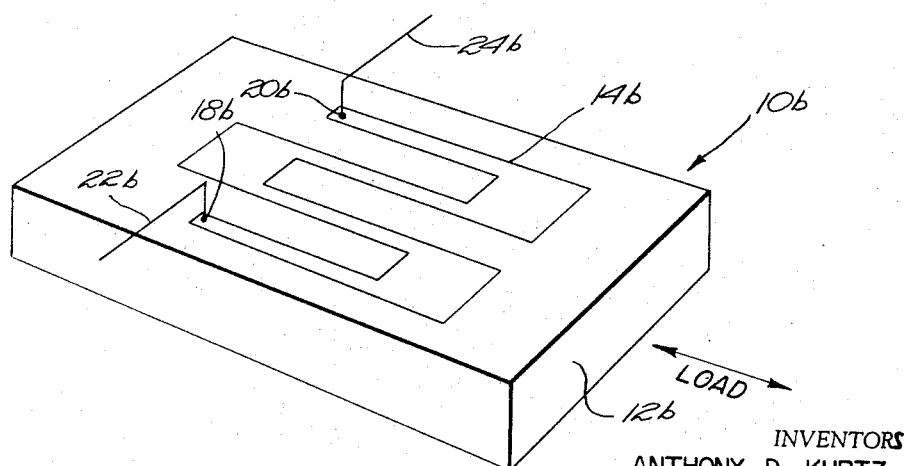

FIG. 3 is a perspective illustration of another strain-sensitive element, in which the active portion of the element has a higher resistance than in the embodiment of FIG. 1, FIG. 4 is a section taken along line 4—4 of FIG. 3, FIG. 5 is an illustration, in perspective, of a third strain-sensitive element in which the active portion has a serpentine form to provide a still greater resistance, FIG. 6 is a composite strain gage unit comprising two strain-sensitive elements of the type shown in FIG. 3, formed in a bridge circuit incorporating a pair of relatively insensitive resistance elements.

FIG. 7 is a perspective view of another embodiment of the bridge illustrated in FIG. 6.

Figure 10:
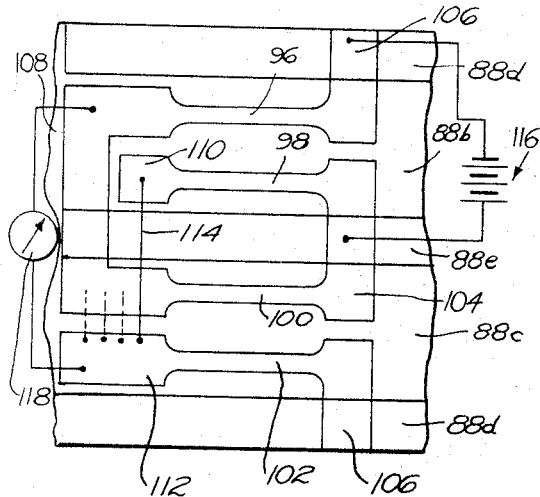
Figure 11:
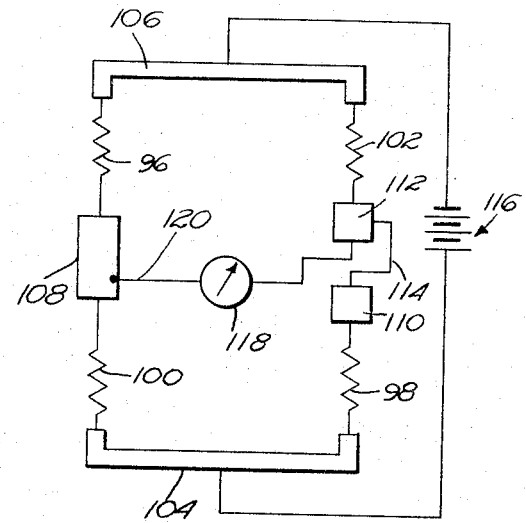
Figure 12:
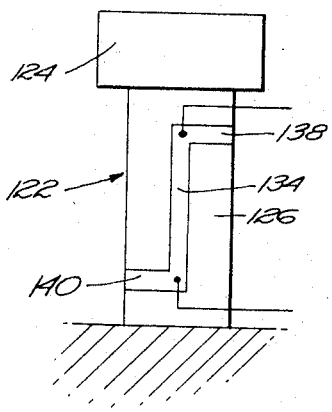
Figure 13:
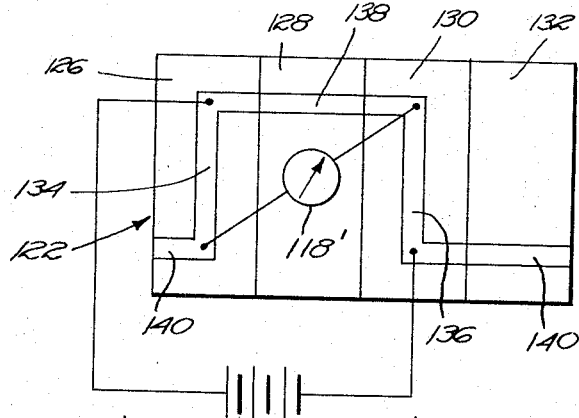
Figures 14, 14A:
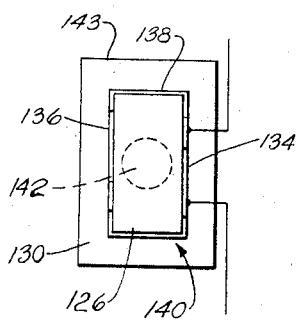

FIG. 8 comprises side and top views of a load cell of the bending beam type incorporating the features of our invention, FIG. 9 is a simplified section taken along line 9—9 of FIG. 8, FIG. 10 is a development of the longitudinal surfaces of the load cell of FIG. 8, illustrating in schematic form the electrical components connected to the load cell, FIG. 11 is a schematic diagram of the electrical elements of FIG. 10, FIG. 12 is a side view of a load cell adapted for measurement of compressive forces, FIG. 13 is a development of the vertical surface of the load cell of FIG. 12, this figure also illustrating in schematic form the electrical components connected to the load cell, FIG. 14 is a side view of a load cell adapted for the measurement of pressure, and FIG. 14A is a top view of the cell of FIG. 14.

Certain dimensions have been exaggerated in the drawings in order to depict more clearly portions having only microscopic thicknesses or widths.

In general, our invention makes use of the fact that a semiconductive layer of one type of conductivity (i.e., either p or n) may be prepared in a body or substrate of semiconductor material of the opposite type of conductivity. This is accomplished in a well-known manner by controlled solid state diffusion, into the substrate, of impurities having the correct doping characteristics. The layer, which is thus separated from the substrate by a p-n junction, serves as a strain-sensitive resistance element which can be connected into a conventional strain gage bridge circuit by means of leads suitably attached thereto. The thickness of the layer, as well as its impurity content, i.e., the charge-carrier density therein, determines its resistance, while the impurity content alone determines the strain sensitivity. Therefore, both of these parameters can be readily controlled in the manner set forth below. This permits the attainment of relatively high resistance, as well as high sensitivity in the element, and together these two features provide a high output voltage per unit of incremental strain.

In this connection, it should be noted that the p-n junction prevents short circuiting of the relatively high resistance layer by the substantially larger and therefore lower-resistance substrate. In order for short circuiting to occur, there must be a current path from one end of the layer into the substrate and back from the substrate into the other end of the layer. In other words, the p-n junction must be crossed twice in opposite directions. Since the junction is the same as that of a conventional junction diode, one of the directions will be the forward direction of the junction and the other, the reverse direction, depending on the polarity of the applied voltage. In the reverse direction, the junction exhibits a very high resistance and thus effectively prevents flow of current between the ends of the layer by way of the substrate.

The electrical isolation of the strain-sensitive layer from the integral substrate provides several important advantages. In the first place, the layer may be made as thin as desired to provide a high resistance while the combined thickness of the layer and substrate is sufficient to lend structural soundness to the element as a whole. Furthermore, the entire unit can be made strong enough to act as a load cell with the substrate supporting most of the load and the strain-sensitive layer providing an indication of the magnitude thereof. Since the element is integral with the substrate, there is no problem of strain transfer such as occurs with a conventional bonded strain gage.

Other features of the invention are described in connection with the specific embodiments illustrated below.

The above-mentioned solid state diffusion can be accomplished in the usual manner by placing pieces of the bulk semiconductor crystal, together with suitable impurity material such as boron, aluminum, gallium or indium in Group III of the Periodic Table (p type conductivity) or antimony, arsenic or phosphorus in Group V (n type conductivity), in a suitable furnace. The temperature of the furnace may be varied, as pointed out below, but it should be high enough so that when the impurity in vapor form passes over the crystal material sufficient diffusion will be accomplished. The vaporized impurity is brought to the bulk crystal by means of a suitable carrier gas.

The magnitude of the unstressed resistance of the strain sensitive layer may be controlled by varying the density of impurities in the layer as well as by varying its depth. By suitable choice of lateral dimensions, that is, the length and width of portions of the layer, together with control of impurity concentration in the layer as well as its depth, resistances from 1 ohm to over 100,000 ohms may be obtained. The term "unstressed resistance," as used herein, means the resistance in the absence of external physical force that would create strain in the strain-sensitive element.

The temperature coefficient of resistance of the layer is another characteristic which depends on the impurity density therein. It can readily be varied from less than 2 percent change in resistance per 100° F. to upwards of 50 percent per 100° F. over a temperature range of 90 to 180° F. Another factor dependent on impurity density is the piezoresistance coefficient, which is related to strain sensitivity by Young's modulus-strain sensitivity can be varied from 40 to 200. A further factor dependent on impurity density is the temperature coefficient of strain sensitivity, which can be varied from approximately 0 to over 17% per 100° F. over the 80 to 180° F. temperature range.

The depth of the strain-sensitive layer can be controlled by means of the temperature to which the bulk semiconductor crystal substrate is heated, and the length of time it is exposed to this temperature. The impurity density is determined by the temperature to which the impurity is subjected during the diffusion process. The nearer that temperature is to the vaporization point of the impurity the greater the impurity density of the layer will be. Further control may be exerted by choice of the carrier gas. In general, a dry inert gas will result in a higher density, and a gas which tends to oxidize the crystal material will result in a lower density.

By suitable masking techniques, such as the use of selective surface oxidation of the crystal prior to diffusion, the lateral dimensions of the surface layer may be closely controlled. The same effect may be obtained by etching or abrading the crystal after diffusion.

As is well known, the strain sensitivity of crystalline semiconductor material depends on the direction of the strain with respect to the crystallographic axes, as well as the direction of the current used to measure the resistance change resulting from the strain. This is discussed in detail in an article by C. S. Smith entitled "Piezoresistance Effect in Germanium and Silicon," published in Physical Review, vol. 94, pp. 42– (Apr. 1, 1954); and an article by W. P. Mason et al. entitled "Use of Piezoresistive Materials in the Measurement of Displacement, Force, and Torque," published in The Journal of the Acoustical Society of America, vol. 29, pp. 1096–1101 (October 1957). More specifically, in silicon having p-type conductivity, maximum sensitivity is obtained when the direction of the measured strain is in a crystallographic direction generally designated as 111, i.e., making equal angles with the crystal axes, and the electric current used to measure the change in resistance is also passed in this direction. For n-type silicon, the direction of strain and current for maximum sensitivity is in a 100 direction along one of the crystal axes. The minimum direction for p-type is 100 and for n-type is 111. These directions lie in the 110 plane so this would be a suitable plane of orientation of the material. In germanium, the direction of maximum sensitivity as along the 111 directions for both p- and n-type conductivity.

The direction of maximum sensitivity is referred to as the "sensitive direction" hereinafter and in the claims. This follows from the fact that the sensitivity in this direction is generally much greater than in directions orthogonal thereto (although the orthogonal direction is not usually the direction of minimum sensitivity).

There is also a marked difference between the maximum sensitivity and the transverse sensitivities associated therewith. These transverse sensitivities relate the effect of strain orthogonal to the direction of measurement on the measured resistance of the gage, and thus they alter the apparatus strain registered by the instrument. A semiconductor gage oriented for maximum sensitivity shows relatively little effect on resistance in the sensitive direction as a result of strains orthogonal to this direction. This materially simplifies calibration problems and also provides a substantially undiminished sensitivity.

Figure 2:
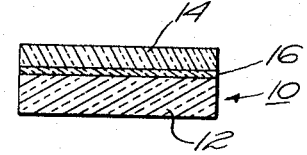
FIG. 2 is a section taken along line 2—2 of FI1. 1.

Turning now to FIGS. 1 and 2, a load sensing member generally indicated at 10 is fashioned from a single piece of crystalline semiconductor material and thus includes a substrate 12 and a surface layer 14 integral with the substrate. The substrate 12 has one type of conductivity (e.g., n-type) and the layer 14 has the opposite type of conductivity (p-type). Thus, although they are structurally integral with each other, the substrate and surface layer are electrically separated by a p-n junction 16. The member 10 is preferably elongated in the strain sensitive direction of the layer 14, and electrodes 18 and 20, suitably affixed to the layer 14, provide for passage of a sensing current through the layer in this direction.

The leads 22 and 24 connect the element 10 to the other components of a sensing system which, in its simplest form, may include a battery 26 and an ammeter 28. Thus, with a known voltage from the battery 26, the meter 28 indicates the resistance of the member 10 between the electrodes 18 and 20.

More particularly, the meter 28 indicates the resistance of the surface layer 14 between the electrodes, since the layer 14 is electrically isolated from the substrate 12, as pointed out above, by the p-n junction 16. This can readily be understood from FIG. 1 by noting that any path of conduction between the electrodes 18 and 20 by way of the substrate 12 must cross the junction 16 twice in opposite directions. The junction has forward and reverse characteristics similar to those of a junction diode, and thus passage through the junction in opposite directions has an effect similar to that of a pair of junction diodes connected in series "back-to-back," with either their anodes or their cathodes connected together. With such a connection, one of the diodes is always connected in the reverse direction to passage of current through the series pair, the particular diode having the reverse bias depending upon the polarity of the impressed voltage. The high resistance thus interposed by the p-n junction 16 is ordinarily much greater thna the resistance of the surface layer 14 between the electrodes 18 and 20, and therefore essentially all of the current between the electrodes passes through the layer 14.

The layer 14 may have a microscopic thickness, e.g., on the order of 0.0001 inch, while retaining structural integrity with the substrate 12. Thus, absent sufficient force to fracture the member 10, there can be no slippage of the layer 14 relative to the substrate 12. Accordingly, the substrate may be made thick enough to support a substantial load while the layer 14 may be sufficiently thin to provide the desired resistance. For example, the member 10 can be used as a rudimentary load column, to which compressive loads are applied along the lengthwise axis. The element will, of course, support a much greater load than would the sensitive layer 14 alone.

In FIGS. 3 and 4 we have illustrated a modification of the member 10 having the same load bearing capacity but a substantially higher resistance in the strain-sensitive layer. A member 10a includes a substrate 12a with a narrow, elongated strain-sensitive surface layer 14a extending in the sensitive direction. Leads 22a and 24a are attached to the layer 14a by means of electrodes 18a and 20a. A p-n junction 16a (FIG. 4) separates the layer 14a from the substrate 12a. The configuration of the surface layer 14a may be obtained by diffusing the doping material through a suitable mask having an aperture defining the surface layer, or, on the other hand, it may be formed by diffusing a surface layer over the entire upper surface of the strain sensitive element and then selectively etching away the undesired portions of the layer. Since the layer 14a is substantially narrower than the layer 14 of FIG. 1, its resistance is correspondingly greater and a greater output signal is therefore readily obtainable from it.

As shown in FIG. 5, a load sensing member 10b, whose parts are numbered similarly to the element 10 of FIG. 1, with the addition of the letter "b," may have a serpentine surface layer 14b whose longest dimension is in the sensitive direction of the crystal. The added effective length of the sensitive portion of the layer 14b results in a further increase in resistance and a corresponding increase in output voltage per unit of strain.

In FIG. 6 we have illustrated a member, generally indicated at 30, which provides all of the arms of a conventional strain gage bridge circuit. The member 30 includes a substrate 32 on the surface of which are strain-sensing elements 34, 36, 38 and 40, which may be formed in the same manner as the surface layers of FIGS. 1–5. The elements 34 and 38 are parallel to each other and perpendicular to the elements 36 and 40. The elements 36 and 40 extend in the sensitive direction of the crystal, and therefore, their resistance varies much more in response to strain in this direction than do the resistances of the elements 34 and 38.

The elements 34 and 40 are connected together by a lead 42 and the elements 36 and 38 by a lead 46. Leads 42 and 46, in turn, connect the strain-sensitive elements to a battery 50, which is thus across one diagonal of the bridge circuit. Across the other diagonal is a voltage sensitive indicator, illustratively a meter 52, connected by means of leads 54 and 56.

Assuming balance of the bridge circuit of FIG. 6 under the no-load condition (obtained, for example, by equality of resistances of the elements 34–40 or by means of resistors connected in series or parallel therewith), the imposition of a strain along the sensitive direction of the member 30 will cause relatively large changes in the resistances of the elements 36 and 40 and much smaller changes in the resistances of the elements 34 and 38. This will unbalance the bridge to provide a strain indication by the meter 52.

In FIG. 7 we have illustrated a novel form for a unitary strain gage bridge. A load bearing member generally indicated at 62 includes a substrate 64 on which are disposed elements 66–72 formed by diffusion in the above manner. The elements 66 and 68 extend in the sensitive direction, and the elements 70 and 72 are perpendicular thereto. Each of the elements is integral with the adjacent elements at its ends, thereby eliminating the need for external connecting wires.

We have found that the elimination of the connecting wires between the elements does away with problems stemming from the contact resistances at the junctions between the wires and the elements. These resistances vary from connection to connection and they also vary in different degrees as functions of temperature, strain and age. Thus, they are often inherent sources of inaccuracy, requiring various compensating procedures in fabrication and use of the gages. The use of integral arms as shown in FIG. 7 thus provides a significant increase in accuracy and reliability for a given cost.

The bridge of FIG. 7 may again be powered by the battery 50 by way of leads 74 and 76, with the output voltage registered by a meter 52 connected to leads 78 and 80.

An advantage of the unitary bridges of FIGS. 6 and 7 over systems using strain-sensitive elements for some of the arms and external resistance for the others is the temperature compensation provided by the elements perpendicular to the sensitive direction (for example, 70 and 72 in FIG. 7). Although these elements are relatively insensitive to the strain imposed on the members, they have the same temperature coefficients of resistance as the strain-sensitive elements. Therefore, as the temperature of the bridge increases or decreases, all the resistances change proportionately, and there is therefore no zero shift. That is, there is substantially no change from the balance condition when no mechanical load is imposed on the unit.

In FIGS. 8–10 we have illustrated a bending beam incorporating the present invention. A member generally indicated at 82 has an enlarged portion 84 suitably anchored in a structure indicated at 86. The member 82 also includes a reduced portion which serves as a bending beam 88 in the measurement of forces shown schematically by a weight indicated at 90. The weight 90 is illustratively supported by a cable 92 secured to the outer end 88a of the beam. Flexure of the beam 88, which is a measure of the force exerted by the weight 90, is ascertained by a strain gage unit generally indicated at 94.

More specifically, the member 82 is fashioned from a piezoresistive crystal, and it extends in the sensitive direction of the diffused layer. As seen in FIGS. 8 and 9, a pair of longitudinally extending strain-sensitive elements 96 and 98 have been formed in the top surface 88b of the beam in accordance with the techniques set forth above, and a similar pair of elements 100 and 102 have been formed in the bottom surface 88c. P-n junctions between the elements 96–102 and the substrate consisting of the body of the beam 88 serve to insulate the elements from each other. During flexure of the beam 88 under the load imposed on its outer end, the upper elements 96 and 98 are lengthened, while the lower elements 100 and 102 undergo a concomitant shortening. Thus, each of the elements is an active one which may be used to contribute to the output of the strain gage unit 94.

This can most readily be understood by reference to FIG. 10, which is a development or unfolding of the longitudinal surfaces of the beam 88. As shown therein, the elements 98 and 100 are connected by a conductor 104 extending between the top and bottom surfaces 88b and 88c by way of the side surface 88e of the beam. Similarly, the elements 96 and 102 are connected by a conductor 106 extending across the side surface 88d. At the other ends of the elements, a conductor 108 extending across the surface 88e connects the elements 96 and 100. Enlarged tabs 110 and 112 at the ends of the elements 98 and 102 are interconnected by a conductor 114.

These connections result in a bridge schematically illustrated in FIG. 11. Illustratively, the bridge is powered by a battery 116 and the output of the bridge is registered by a voltage sensitive indicator designated at 118. It will be noted that the elements 96 and 98, which are extended by the load, are in opposite arms of the bridge, as are the compressed elements 100 and 102. Thus, the strain on each of the elements is added into the output of the bridge.

Returning to FIG. 10, the conductors 104 and 108 and tabs 110 and 112 are formed in the same manner as the elements 96–102, and therefore, they are extensions of the elements. The conductor 114, on the other hand, is preferably of a resistance material providing approximately the same resistance as the conductor 108. For example, the conductor 114 may be formed by first depositing a layer of insulating material (not shown) over the surface of the beam 88 between the tabs 110 and 112. Then, the conductor 114 is laid down according to printed circuit techniques in the form of a resistive ink. Another method, of course, is to use wire suitably affixed at its ends to the tabs 110 and 112.

The conductors 104, 106 and 108 are substantially wider than the strain-sensing elements 96–102, and therefore, their electrical resistances are substantially less than the resistances of the elements. Moreover, the currents in these conductors are perpendicular to the direction of strain. Accordingly, the variations in the voltages across these conductors in response to loading on the beam 88 are small compared to the variations in the voltage drops across the elements 96–102. Therefore, the conductors have little effect on the output voltage of the bridge. This effect may be further minimized by centering the battery connections, as shown in FIG. 11 so that the voltage drops across the two halves of each of the conductors 104 and 106 are equal and therefore cancel each other.

Adjustment of the bridge for initial balance may be accomplished by etching or grinding away portions of the elements 96–102 or similarly altering the resistances of the conductors joining the elements. Adjustment may also be accomplished by means of the positions along the conductor 108 and tab 112 at which the indicator 118 and conductor 114 are connected, or similarly by means of the positions along 104 and 106 at which the battery 116 is connected. This will be apparent from inspection of FIG. 11, wherein it is seen that the conductor 108 and the conductor 120 connecting it to the indicator 118 function together as a potentiometer. The tab 112 and conductor 114 provides a variable resistance which is changed by moving the conductor 114 along the tab.

In FIGS. 12 and 13, we have illustrated a load column embodying our invention. The column, which is generally indicated at 122, senses the axial force exerted on it, illustratively by a force-exerting member 124. The column 122 is a semiconductor in monocrystalline form as described above, with the sensitive direction preferably extending vertically. As shown in FIG. 13, it has a square cross section with vertical surfaces 126, 128, 130 and 132.

On the surfaces 126–132 are strain-sensing elements formed in the manner described above and arranged as an integral bridge similar to the bridge of FIG. 7. More specifically, vertical elements 134 and 136 are disposed on the surfaces 126 and 130, while horizontal elements 138 and 140 extend across the surfaces 128 and 132 to interconnect the vertical elements. The elements are connected, as schematically shown, to a battery 116' and an indicator 118'.

In operation, the elements 134 and 136 follow the compression or extension of the column 122 in response to the load imposed thereon, and since they are in opposite arms of the bridge circuit shown in FIG. 13, their effects are added to in the output signal of the bridge. Furthermore, the dimensional changes in the horizontal elements 138 and 140 are opposite to those of the vertical elements. Therefore, the changes in resistance of the horizontal elements operate additively, though on a much diminished scale, to those of the vertical elements in the output voltage of the bridge. The output of the elements 138 and 140 is reduced both because the Poisson's ratio strain is less and because the strain sensitivity of these elements is lower in the orthogonal direction. The chief reason for using these arms is not increased output but the temperature compensation provided by having all bridge arms of the same temperature coefficient and at the same temperature. Should the beam flex about an axis parallel to the surfaces 126 and 130, one of the vertical elements 134 and 136 will be stretched and the other compressed. Therefore, their effects on the bridge output voltage will be in opposite directions, tending to cancel each other and thus minimize the sensitivity of the column 122 to bending stresses. A similar analysis demonstrates the relative insensitivity of the beam 88 of FIG. 8 to longitudinal stresses.

A desirable material for the column 122 is n-type silicon, since the characteristics of the p-type element formed thereon are better for strain measurement. The output is higher, the linearity is better, and the temperature coefficient of sensitivity is lower for p-type silicon than n-type of equivalent resistivity.

A pressure cell shown in FIGS. 14 and 14A is somewhat similar to the load cell of FIG. 12, with the addition of a threaded bore 142 in a base 143 for admission of a fluid under pressure to the interior of a tube 144. In this case, the sensitive elements, 134 on the side shown and 136 on the opposite side, are on a thin-walled section of the hollow tube under pressure. Elements 138 and 140 are on a heavy-walled section of the tube and are mostly in a relatively insensitive crystallographic direction to contribute temperate compensation with no loss in output. The elements 134–140 are segmented as shown to provide high resistances with wide, low resistance portions 146 connecting the successive portions.

It will be apparent that many variations may be made in the load cells of FIGS. 8–13 without departing from the scope of our invention. For example, the configurations of the strain-sensing elements and the conductors connecting them may be different than those specifically illustrated. Also, the cross-sections of the beam 88 and column 122 need not be square, as shown, but may have other shapes, including rectangular and circular.

It will thus be seen that the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

We claim:
1. A pressure measuring device comprising
 (A) a monocrystalline body having surface layer portions separated from an integral substrate by a junction forming an electrical p-n conductivity barrier,
 (B) said body having
  (1) first and second opposite sides, and
  (2) third and fourth opposite sides transverse to said first and second sides,
 (C) means forming a chamber disposed between said sides and communicating with the exterior of said body, whereby a fluid whose pressure is to be moni- tored by said device can be admitted to said chamber,
(D) said portions including first, second, third and fourth strain-sensing portions connected in series in the order named by other layer portions to form a bridge circuit with said first and third strain-sensing portions being in opposite arms of said bridge circuit,
   (1) said first and third strain-sensing portions being on said first and second sides,
   (2) said second and fourth strain-sensing portions being on said third and fourth sides,
(E) the sensitive direction of said layer extending substantially along said first and second sides,
(F) said first and third strain-sensing portions extending in said sensitive direction.

2. The combination defined in claim 1 in which the wall thickness of said device is greater at said third and fourth sides than at said first and second sides.

3. The combination defined in claim 1 in which
(A) said chamber is elongated,
(B) said strain-sensing portions include a plurality of sections transverse to said chamber and interconnected by connecting sections,
(C) said connecting sections being substantially wider than said sensing portion sections.

4. A pressure measuring device comprising
(A) a monocrystalline body having surface layer portions separated from an integral substrate by a p-n junction forming an electrical conductivity barrier,
(B) said body having
   (1) first and second opposite sides, and
   (2) third and fourth opposite sides transverse to said first and second sides,
(C) means forming a chamber in said body and disposed between said sides, said device monitoring the difference in pressure between the interior of said chamber and the exterior of said body,
(D) said portions including first, second, third and fourth strain-sensing portions connected in series in the order named by other layer portions to form a bridge circuit with said first and third strain-sensing portions being in opposite arms of said bridge circuit,
   (1) said first and third strain-sensing portions being on said first and second sides,
   (2) said second and fourth strain-sensing portions being on said third and fourth sides,
(E) the sensitive direction of said layer extending substantially along said first and second sides,
(F) said first and third strain-sensing portions extending in said sensitive direction.

References Cited

UNITED STATES PATENTS

| | | | |
|---|---|---|---|
| 3,049,685 | 8/1962 | Wright | 338—2 |
| 3,071,745 | 1/1963 | Stedman | 338—2 |
| 3,079,576 | 2/1963 | Kooiman | 338—4 |
| 3,128,628 | 4/1964 | Lebow | 73—398 |
| 3,160,844 | 12/1964 | McLellan | 338—4 |
| 3,237,138 | 2/1966 | Kooiman et al. | |
| 3,242,449 | 3/1966 | Stedman. | |

FOREIGN PATENTS

| | | |
|---|---|---|
| 921,837 | 3/1963 | Great Britain. |
| 923,153 | 4/1963 | Great Britain. |

OTHER REFERENCES

Pfann et al.: "Semiconducting Stress Transducers Utilizing the Transverse and Shear Piezoresistance Effects," Journal of Applied Physics, vol. 32, No. 10, October 1961, pp. 2008–2019. (Copy in 73–88.5).

RICHARD C. QUEISSER, *Primary Examiner.*

C. A. RUEHL, *Assistant Examiner.*